United States Patent
Hansen et al.

(10) Patent No.: US 8,372,162 B2
(45) Date of Patent: Feb. 12, 2013

(54) METHOD OF PRODUCING SODIUM CARBONATE DECAHYDRATE

(75) Inventors: David M. Hansen, Green River, WY (US); John T. Fuller, Green River, WY (US)

(73) Assignee: Solvay Chemicals, Inc., Houston, TX (US)

( * ) Notice: Subject to any disclaimer, the term of this patent is extended or adjusted under 35 U.S.C. 154(b) by 440 days.

(21) Appl. No.: 12/743,551

(22) PCT Filed: Nov. 28, 2008

(86) PCT No.: PCT/EP2008/066470
§ 371 (c)(1),
(2), (4) Date: May 18, 2010

(87) PCT Pub. No.: WO2009/068670
PCT Pub. Date: Jun. 4, 2009

(65) Prior Publication Data
US 2010/0290976 A1    Nov. 18, 2010

Related U.S. Application Data

(60) Provisional application No. 61/004,686, filed on Nov. 29, 2007.

(51) Int. Cl.
*C01D 5/00* (2006.01)

(52) U.S. Cl. .................. 23/302 T; 23/295 R; 423/422

(58) Field of Classification Search ............... 23/302 R, 23/302 T, 295 R; 423/422, 425
See application file for complete search history.

(56) References Cited

U.S. PATENT DOCUMENTS

| | | | |
|---|---|---|---|
| 1,853,275 A | 4/1932 | Houghton et al. | |
| 3,687,638 A | 8/1972 | Neitzel | |
| 4,564,508 A | 1/1986 | Fairweather et al. | |
| 4,869,882 A | 9/1989 | Dome et al. | |
| 2004/0197258 A1 | 10/2004 | Braman et al. | |

*Primary Examiner* — Edward Johnson
(74) *Attorney, Agent, or Firm* — Beatrice C. Ortego

(57) ABSTRACT

A method of producing crystals of crystallizable mineral salt comprises introducing an effluent comprising a dissolved crystallizable mineral salt at a temperature higher than the mineral salt crystallization temperature to a crystallization pond area to provide a pond solution; cooling the pond solution to provide cooling crystallization promoting conditions effective to form a crystalline mineral salt deposit; stopping the flow of the effluent; draining remaining spent liquor to a liquor pond area; and recovering the deposit. Cooling the pond solution may comprise exposure to cool ambient temperatures which are lower than the crystallization temperature. Preferably, the mineral salt includes or is sodium carbonate decahydrate; the pond solution comprises less than 10% NaCl; and/or the decahydrate deposit is sent or recycled to a soda ash plant. The deposit thus formed by cooling crystallization has a higher purity, lower hardness, and/or lower density than a deposit formed by evaporative crystallization.

28 Claims, 4 Drawing Sheets

METHOD OF PRODUCING SODIUM CARBONATE DECAHYDRATE

CROSS-REFERENCE TO RELATED APPLICATIONS

The present application is a U.S. national stage application under 35 U.S.C. §371 of International Application No. PCT/EP2008/066470 filed Nov. 28, 2008, which claims the benefit of U.S. Provisional Application Ser. No. 61/004,686, filed Nov. 29, 2007, this application being herein incorporated by reference in its entirety for all purposes.

FIELD OF THE INVENTION

This invention relates to a method of producing sodium carbonate decahydrate from soda ash plant effluent.

BACKGROUND

Soda ash or sodium carbonate is a valuable mineral source. Soda ash is one of the largest volume alkali commodities made in the United States. Soda ash finds major use in the glass-making industry and for the production of baking soda, detergents and paper products.

The processes for the production of soda ash employ crystallization steps that concentrate impurities in the mother liquors. Purge streams are required in these processes to remove impurities. The purge or waste streams include soda ash as well as impurities, such as sodium bicarbonate, sodium chloride, and sodium sulfate. Typically, in the manufacture of soda ash, a system of storage ponds has been used to accommodate disposal of the effluent streams including purge streams, mine water, and other sources of waste waters inherent to the process. The effluent stream is transported year-round to a pond. During the summer, water evaporates from the pond and sodium carbonate decahydrate precipitates into a solid mass with impurities, including sodium bicarbonate and sodium sulfate. In the winter, crystals form by cooling crystallization, and are deposited at the bottom of the pond over the previously deposited summer precipitation. The evaporation process also concentrates the amount of sodium chloride and other impurities in the pond solution. The liquid in the continuously filled ponds typically has NaCl levels of greater than 11% in the summer and 14% in the winter.

The sodium carbonate decahydrate crystals (along with substantial impurities) deposited on the pond bottom reduce the total pond volume. Although these sodium carbonate decahydrate deposits may be removed from the pond, they are hard, dense, and difficult to remove. A substantial amount of sodium carbonate decahydrate resides in these ponds. If the mass is not removed, the solids eventually fill the available waste pond volume until an increase in pond volume must occur, either by raising existing dikes, expansion of existing waste ponds, or the construction of new ponds.

Previous patents have attempted to address the difficulties in recovering soda ash from impure solutions. U.S. Pat. No. 1,853,275 indicates that it is known that sodium carbonate decahydrate may be recovered from a brine solution by crystallizing the solution in a pond over the winter months. U.S. Pat. No. 4,564,508 teaches the use of a non-convective solar pond to crystallize sodium carbonate decahydrate from an impure sodium carbonate solution. The sodium carbonate decahydrate crystals travel to the bottom layer of the pond where they are dehydrated to sodium carbonate monohydrate. U.S. Patent Publication 2004/0197258 indicates that deposited sodium carbonate decahydrate present in evaporation ponds may be recovered by solution mining the deposits.

Thus, it would be desirable to find a way to process the effluent to allow recovery of sodium carbonate decahydrate of improved purity. Additionally, it would be desirable to have sodium carbonate decahydrate that can be more easily removed from the pond to recover the valuable soda ash.

BRIEF SUMMARY OF THE INVENTION

In one aspect, a method of producing crystals of a crystallizable mineral salt comprises providing a crystallization pond area; providing a mother liquor pond area situated in proximity to the crystallization pond area; providing an effluent comprising a mineral salt solution in water; introducing the effluent to the crystallization pond area to provide a pond solution comprising the mineral salt; cooling the pond solution in the crystallization pond area solution by exposure to ambient temperature to provide cooling crystallization promoting conditions effective in forming mineral salt crystals and to form a crystalline deposit; stopping the flow of the effluent to the crystallization pond area during at least a portion of a time period wherein exposure of the pond liquor to ambient temperature no longer supports cooling crystallisation promoting conditions of the mineral salt; draining liquor from the crystallization pond area to the mother liquor pond area; and removing the deposit comprising said mineral salt crystals from the crystallization pond area.

In another aspect, a method of producing crystals of a crystallizable mineral salt, comprises providing a first crystallization pond area and a second crystallization pond area; providing a mother liquor pond area situated in proximity to the crystallization pond areas; providing an effluent comprising a mineral salt solution; introducing the effluent to the first crystallization pond area to provide a first pond solution comprising the mineral salt; cooling the pond solution in the first crystallization pond area solution by exposure to ambient temperature to provide cooling crystallization promoting conditions effective in forming mineral salt crystals and to form a first crystalline mineral salt deposit during at least a portion of a first time period in which the average daily high ambient temperature is less than Tcrystallization; stopping the flow of the effluent to the first crystallization pond area during at least a portion of a second time period in which cooling crystallization promoting conditions during at least a portion of a second time period wherein exposure of the pond liquor to ambient temperature no longer supports cooling crystallisation promoting conditions of the mineral salt; introducing the effluent to a second crystallization pond area by exposure to ambient temperature to provide evaporative crystallization promoting conditions effective in crystallizing sodium carbonate decahydrate to form a second deposit during at least a portion of a third time period in which the average daily high ambient temperature is greater than Tcrystallization; wherein the first mineral salt deposit generated under cooling crystallization promoting conditions differs from the second mineral salt deposit generated under evaporative crystallization promoting conditions in a property selected from the group consisting of purity in mineral salt; hardness, density, and combinations of two or more thereof.

In yet another aspect, a method of producing sodium carbonate decahydrate comprises providing a crystallization pond area; providing a liquor pond area situated in proximity to the crystallization pond area; providing an effluent comprising a sodium carbonate solution in water; introducing the effluent to the crystallization pond area to provide a pond solution comprising sodium carbonate; cooling the pond solution in the crystallization pond area by exposure to ambient temperature to provide cooling crystallization promoting conditions effective in forming crystals of sodium carbonate decahydrate and to form a crystalline sodium carbonate decahydrate deposit; stopping the flow of the effluent to the crystallization pond area during at least a portion of a time period wherein exposure of the pond liquor to ambient temperature no longer supports cooling crystallisation promoting conditions of sodium carbonate decahydrate; draining liquor from the crystallization pond area to the liquor pond area; and removing the crystalline sodium carbonate decahydrate deposit from the crystallization pond area. The pond solution preferably comprises less than 10% NaCl and less than 3% $Na_2SO_4$.

In yet another aspect, a method of producing sodium carbonate decahydrate includes providing a crystallization pond area. A mother liquor pond area is situated at a lower elevation than the crystallization pond area. Effluent including a sodium carbonate solution in water is introduced to the crystallization pond area to provide a pond solution preferably comprising less than 10% NaCl. The pond solution is cooled in the crystallization pond area to precipitate sodium carbonate decahydrate during a first period, such as a winter season, wherein the average daily high temperature over a thirty day period is less than 50° F., or preferably less than 35° F. The flow of the effluent to the crystallization pond area is stopped. Liquor is drained from the crystallization pond area to the mother liquor pond area before a second season, such as a spring season, wherein the average daily high temperature over a thirty day period is greater than 50° F., or preferably greater than 35° F. The sodium carbonate decahydrate is removed from the crystallization pond area.

In yet another aspect, a method of producing sodium carbonate decahydrate includes providing a first pond area, a second pond area, and a third pond area situated at a lower elevation than the first and second pond areas. Effluent including a sodium carbonate solution in water is introduced to the first pond area to provide a pond solution comprising less than 10% NaCl and less than 3% $Na_2SO_4$. The effluent in the first pond area is cooled to precipitate sodium carbonate decahydrate during a first period, such as a winter season, wherein the average daily high temperature over a thirty day period is less than 50° F., or preferably less than 35° F. The flow of the effluent to the first pond area is stopped. The effluent is introduced to the second pond area. A liquor is drained from the first pond area to the third pond area. The sodium carbonate decahydrate is removed from the first pond area by mechanical excavation. Effluent in the second pond area repeats the same cycle as described for the first pond area in alternating winter seasons or shorter time periods.

The foregoing and other features and advantages of the present invention will become apparent from the following detailed description of the presently preferred embodiments, when read in conjunction with the accompanying examples.

DETAILED DESCRIPTION OF THE DRAWINGS AND PREFERRED EMBODIMENTS

Figure 1:
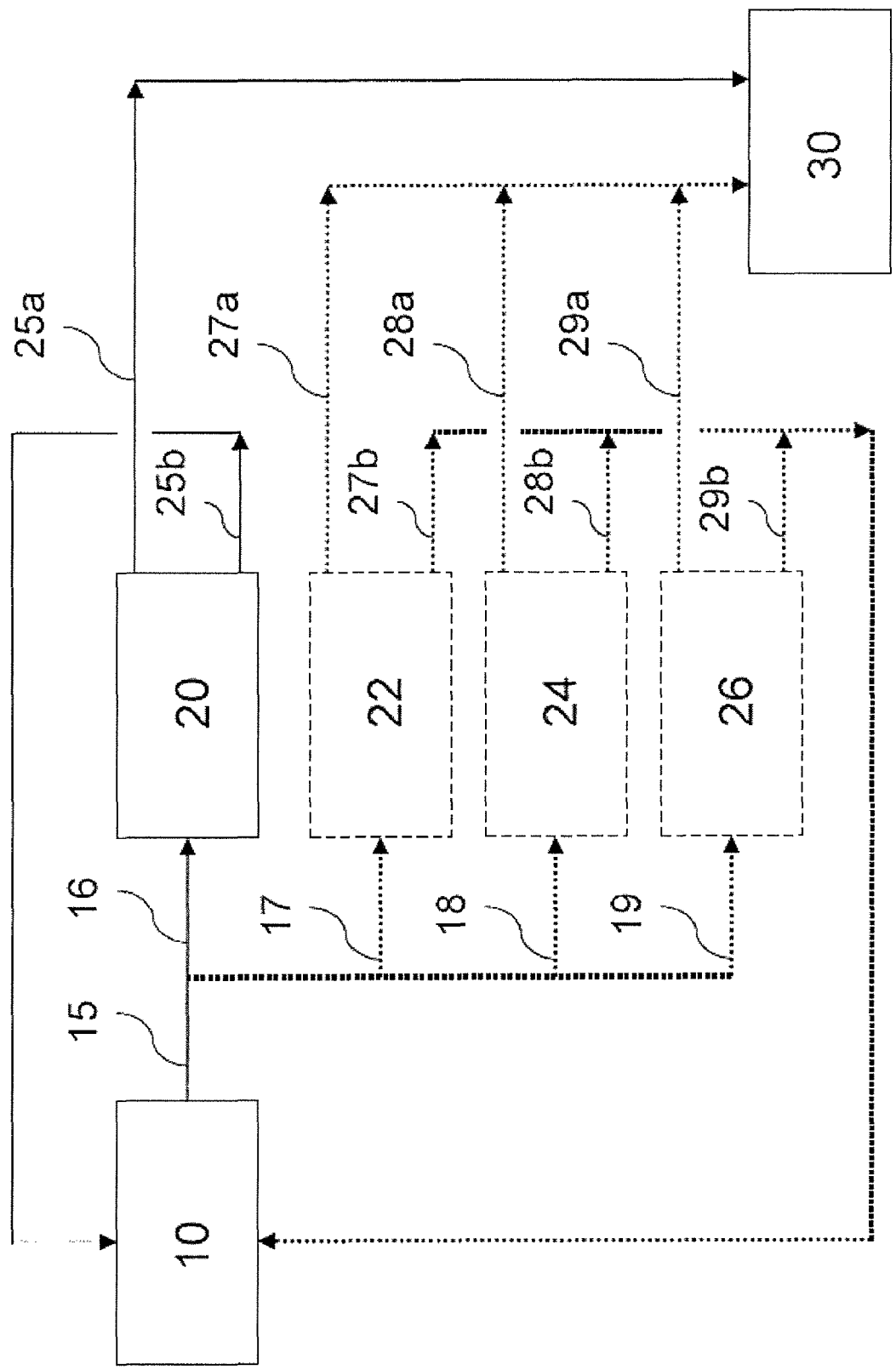
FIG. 1 is a flow chart showing an embodiment of a method of producing sodium carbonate decahydrate.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention provides a method of producing sodium carbonate decahydrate from a waste water stream. It has been found that by allowing sodium carbonate decahydrate in the effluent to crystallize in a pond area under cooling crystallization promoting conditions, such as during the cool ambient temperature of the winter season, it is possible to obtain a deposit comprising sodium carbonate decahydrate in the pond area, wherein this sodium carbonate decahydrate deposit has increased purity, lower hardness, reduced density, and is easier to remove, compared to a sodium carbonate decahydrate deposit formed under evaporative crystallization promoting conditions.

Previous crystallization techniques have used evaporative crystallization. In evaporative crystallization, water is allowed to evaporate from the effluent in the pond area, typically during the summer months. As water evaporates, the resulting solution becomes more concentrated in solutes such as sodium carbonate, resulting in the formation of crystals including crystalline sodium carbonate decahydrate. These crystals are deposited at the bottom of the pond area. This evaporative deposit is generally a very dense, hard crystalline mass with a bulk density of greater than 85 lbs/ft$^3$ (or greater than 1,362 kg/m$^3$), more frequently greater than 90 lbs/ft$^3$ (or greater than 1,442 kg/m$^3$), and typically about 93 lbs/ft$^3$ (or about 1,490 kg/m$^3$). This evaporative deposit is very difficult to remove. Moreover, the evaporative sodium carbonate decahydrate deposit also contains significant amount of impurities. An exemplary composition of an evaporative sodium carbonate decahydrate deposit is shown in Table 1 below:

TABLE 1

|  | Average |
|---|---|
| $Na_2CO_3$, wt % | 34.9 |
| $NaHCO_3$, wt % | 2.7 |
| NaCl, wt % | 0.37 |
| $Na_2SO_4$, wt % | 1.2 |

The process described herein uses cooling crystallization promoting conditions to crystallize sodium carbonate decahydrate in a pond area and to form at the bottom of this pond area a deposit which has increased purity in sodium carbonate, lower density, and/or lower hardness and which is easier to remove by mechanical means, compared to a sodium carbonate decahydrate deposit formed under evaporative crystallization promoting conditions.

For example, cooling crystallization promoting conditions may include an average daily pond solution temperature below the crystallization temperature (Tcrystallization) of sodium carbonate decahydrate. Tcrystallization of a salt is the maximum temperature at which, for a given composition of a salt solution, crystals of the salt can be formed. In the case of sodium carbonate decahydrate, such temperatures are given by the curve segment A-B of FIG. 4.

For an additional or alternate example, the effluent may be directed to a cooling crystallization pond area during a period of time where the average ambient high temperature is below 50° F. (or below 10° C.), or preferably 35° F. or less (or 1.7° C. or less), for a period of at least 30 days (e.g., during winter months).

Additionally or alternatively, the effluent may be directed to a cooling crystallization pond area during a period of time where the daily average pond solution temperature is equal to or less than Tcrystallization −5° C., or equal to or less than Tcrystallization −10° C., or equal to or less than Tcrystallization −15° C., or equal to or less than Tcrystallization −20° C.

Additionally or alternatively, the effluent may be directed to a cooling crystallization pond area to form the pond solution during a period of time where the daily average pond solution temperature is below 50° F. (or below 10° C.), or preferably 35° F. or less (or 1.7° C. or less), for a certain period of time such as at least 30 days (e.g., during winter months).

Providing cooling crystallization promoting conditions may include exposing the pond solution to natural atmospheric conditions, whereby cooling may be effected by exposure to cool temperatures, such as temperatures lower than the crystallization temperature (Tcrystallization) of sodium carbonate decahydrate, wherein the crystallization temperature is determined for the given sodium carbonate content in the effluent composition.

In such process, the step of cooling the pond solution to provide the cooling crystallization promoting conditions may comprise exposing the pond solution to ambient temperature during at least a portion of a 30-day time period in which the average daily high ambient temperature is equal to or less than Tcrystallization −5° C., or equal to or less than Tcrystallization −10° C., or equal to or less than Tcrystallization −15° C., or equal to or less than Tcrystallization −20° C.

In other embodiments, the step of cooling the pond solution to provide cooling crystallization promoting conditions may comprise exposing the pond solution to ambient temperature during at least a portion of a 30-day time period in which the average daily high ambient temperature is less than 50° F. (10° C.), or is less than 35° F. (1.7° C.).

The cooling crystallization in the pond area is then terminated by stopping the effluent flow after a certain time period (e.g., a 15-day or 30-day period) during which the average daily high ambient temperature is greater than 35° F. Alternatively, the step of stopping the effluent flow is carried out after a certain time period (e.g., a 15-day or 30-day period) during which the average daily high ambient temperature is greater than 50° F. The cooling crystallization in the pond area is preferably terminated while the average daily high ambient temperature is still below (or does not exceed) the crystallization temperature of sodium carbonate decahydrate, so as to prevent dissolution of the formed crystalline deposit in the pond area.

FIG. 1 shows a flow chart of a crystallization process, which comprises a plant 10, a crystallization pond area 20, a liquor pond area 30, and optionally other pond areas 22, 24, 26.

The plant 10 can be any plant providing an alkali product-containing effluent. The plant 10 is preferably a plant which generates a sodium carbonate-containing effluent. For example plant 10 may be a soda ash production plant or a pulp and paper mill. The plant 10 produces a plant effluent 15 which is directed to the pond area 20.

The effluent 15 preferably includes a sodium carbonate solution in water. The effluent 15 may include a purge stream from a soda ash plant (which may be plant 10). In addition to sodium carbonate, the effluent may contain salt impurities, including sodium bicarbonate ($NaHCO_3$), sodium chloride (NaCl), and/or sodium sulfate ($Na_2SO_4$). Typical levels of impurities are from 2% to 3% $NaHCO_3$, from 3.5% to 4% NaCl, and from 0.4% to 1.0% $Na_2SO_4$. It is desirable to recover the sodium carbonate from the effluent 15 by separating out the salt impurities from sodium carbonate decahydrate.

The effluent 15 is introduced to the crystallization pond area 20 to provide a pond solution comprising sodium carbonate. The effluent should be at a temperature higher than the crystallization temperature (Tcrystallization) of sodium carbonate decahydrate. In some embodiments, the effluent may be at a temperature of between 90° F. and 140° F. (or between 32.2° C. and 60° C.) when it is introduced into the crystallization pond area 20.

In order to minimize the amount of impurities in the pond solution in crystallization pond 20 (and optional ponds 22, 24, 26), it is preferable that the crystallization pond area 20 is a drained pond area before the effluent 15 is introduced. In other words, the effluent 15 is introduced into a pond area that is substantially dry, and free from other wastewater containing various impurities. After the effluent 15 is introduced into the pond area 20, if there are soluble materials present in the pond area before the effluent is introduced, the soluble materials will tend to be dissolved by the effluent and may introduce impurities into the pond solution. The pond solution formed after the effluent is introduced into the pond area 20 preferably includes less than 10% NaCl and less than 3% $Na_2SO_4$.

The pond area 20 may be a separate pond, or a portion of a pond. The pond area 20 is operated under cooling crystallization promoting conditions which are effective in forming sodium carbonate decahydrate crystals which precipitate out of the pond solution. Under these cooling crystallization promoting conditions, a sodium carbonate decahydrate deposit forms at the bottom of the pond area 20, and the remaining liquor above this deposit is generally leaner in sodium carbonate content than the effluent 15. The sodium carbonate decahydrate deposit may also contain other solid mineral impurities such as sodium bicarbonate, sodium chloride and/or sodium sulfate.

The remaining liquor from the crystallization pond area 20 is drained via line 25a to the mother liquor pond 30.

The sodium carbonate decahydrate deposit can be recovered from the crystallization pond area 20. The recovery may include mechanical means, such as a front-end loader or any other equipment which allows for easy recovery of sodium carbonate decahydrate deposit. The mechanical means employed for recover of this deposit is generally less expensive to use and requires less energy than the equipment that would be needed for the excavation of a sodium carbonate decahydrate deposit generated by evaporative crystallization. The recovered deposit is preferably fed to a soda ash process or reintroduced via line 25b to plant 10 when it comprises a soda ash purification process.

The pond area 20 (or any optional pond 22, 24, 26) is preferably capable of handling a depth of at least six feet (1.83 meters) high of effluent, and would typically be from 1 to 100 acres (4,047-405,000 m2) in surface area. The pond may have a top surface membrane or spreader disposed on floor or a hard sodium carbonate decahydrate layer. The pond membrane or spreader serving as liquid-impermeable substrate may cover at least one part of the bottom of the pond area 20, such as covering a pond section disposed around a point of discharge of the effluent 15 into the pond area 20. Several pond membranes may be disposed over several sections of the pond area 20, as several points of effluent discharge may be used simultaneously, or the point of effluent discharge may be displaced over time from one pond section covered by a membrane to another pond section covered by a another membrane. A pond membrane or a plurality of pond membranes may cover the entirety of the pond area 20. Each pour point of effluent may be at least 20 feet; or at least 200 feet up to 0.5 mile away to optimize the depth of deposit. The sodium carbonate decahydrate deposit may vary in depth from 12 inches at the pour point to 2 inches up to 1000 feet from the pour point. Membranes may vary in size, but generally are sized for a few hundreds feet in width and length; the membrances may be square with about 100 feet per side. The pond sides may be constructed of any suitable material. The pond sides are typically up to about six feet in height and may extend several feet below any deposits and into the underlying soil.

In one optional embodiment, the crystallization system may use several crystallization pond areas 20, 22, 24, 26 to crystallize sodium carbonate decahydrate. Some of or all of the pond areas 20, 22, 24, 26 may be operated in parallel under cooling crystallization promoting conditions, wherein fractions of the effluent 15 in respective lines 16, 17, 18, 19 may be fed separately to ponds 20, 22, 24, 26, respectively. In some embodiments, some of the ponds may be operated in parallel under cooling crystallization promoting conditions, while the remainder of the ponds are not in crystallization operation mode, for example, may be in draining mode, or in deposit removal mode, or may be newly created.

Similarly as described above, the remaining spent liquor from the crystallization pond areas 20, 22, 24, 26 are drained via lines 25a, 27a, 28a, 29a, respectively to the mother liquor pond 30.

The sodium carbonate decahydrate deposit can be recovered from pond areas 20, 22, 24, 26. The recovered deposits may be fed to a soda ash process or may be reintroduced via respective lines 25b, 27b, 28b, 29b, either independently or pooled, to the plant 10 when it comprises a soda ash purification process (as shown in FIG. 1).

The mother liquor pond area 30 is preferably hydraulically connected to the crystallization pond area 20, as well as to optional ponds 22, 24, 26. That is to say, the mother liquor pond area 30 is situated in proximity to these ponds, when the distance between one edge of pond 30 to one edge of each pond 20, 22, 24, 26 is less than 1,000 meters (3283 feet), or preferably less than 800 meters (2625 feet), or preferably less than 600 meters (1969 feet). The proximity of these ponds 20, 22, 24, 26 to pond 30 allows for the remaining liquor in these crystallization ponds to be directed into the mother liquor pond area 30 by means of pipes or overflow. The mother liquor pond area 30 is preferably disposed with respect to pond areas 20, 22, 24, 26, such that the remaining liquor exiting these ponds 22, 24, 26 can be gravity fed to the mother liquor pond area 30. For example, by positioning the liquor discharge point(s) from each pond area 20, 22, 24, 26 at a higher elevation than the mother liquor pond area 30 and/or by positioning the mother liquor pond 30 at a lower elevation than each pond area 20, 22, 24, 26, the liquor from the crystallization pond area 20 may be transferred by gravity rather than by pumps. Feeding the remaining liquor from crystallization pond(s) to mother liquor pond area 30 by gravity is preferable compared to feeding by pumping, because sodium carbonate decahydrate may crystallize in the pump parts. For example, during cool ambient temperatures in the winter, the cold liquor can be supersaturated, so that adding mechanical energy into the liquor solution (such as by pumping) can cause sodium carbonate decahydrate crystals to rapidly form in the transfer lines and the pumping equipment.

Figure 2:
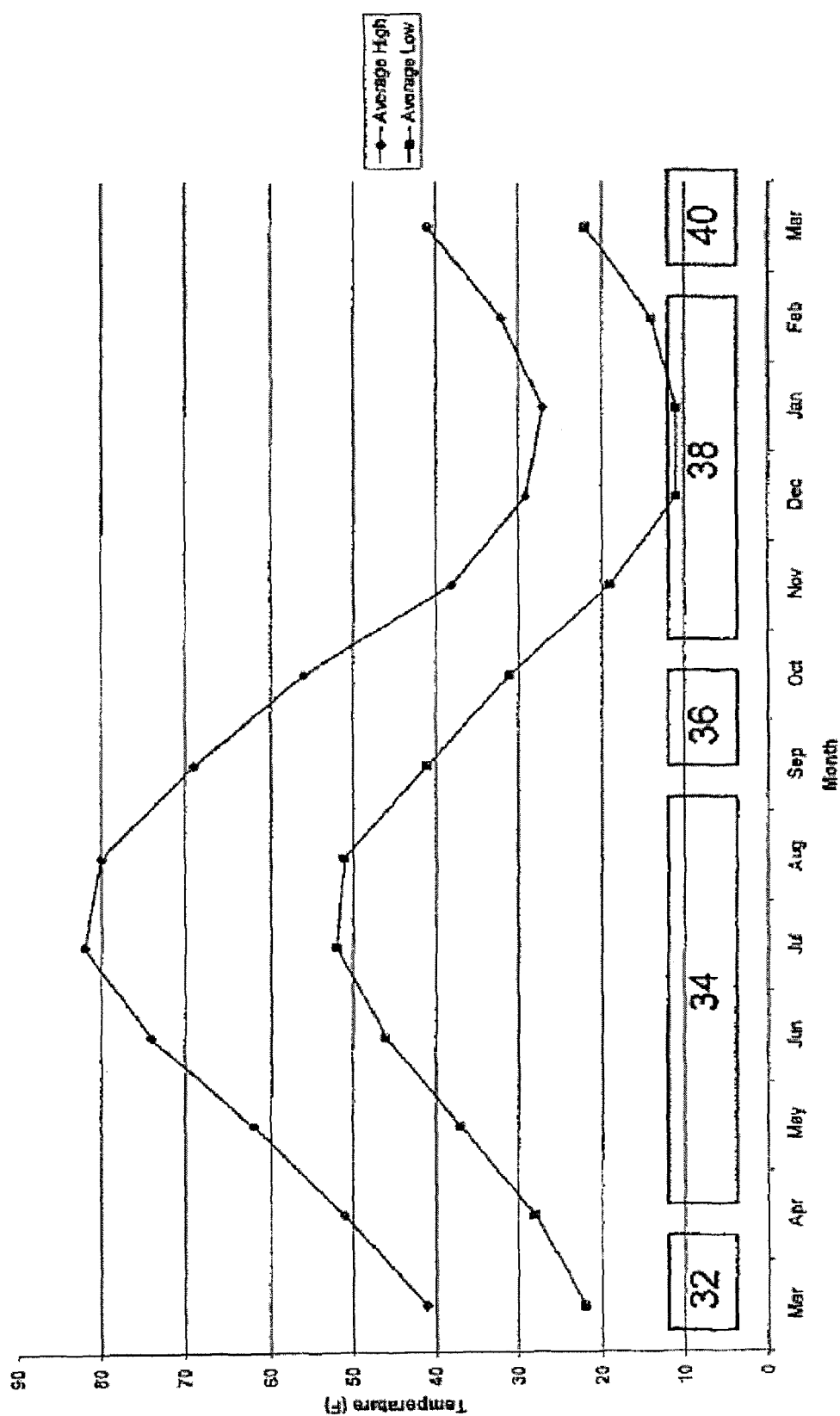
FIG. 2 is a chart showing the average daily high and low temperatures for Rock Springs, Wyo., and the steps of an embodiment of a method of producing sodium carbonate decahydrate.

FIG. 2 shows the average daily highs and lows for Rock Springs, Wyo., near the Green River plant wherein the tests described in the Examples below were conducted. Also shown in FIG. 2 is an exemplary crystallization cycle as a function of time. As an overview, the process includes a filling step 32, an evaporative step 34, a transition step 36, a cooling crystallization step 38, and a drainage step 40. In a first preferred embodiment, the evaporative step 34 and the cooling crystallization step 38 are performed in separate ponds. In a second alternate embodiment, the evaporative step 34 and the cooling crystallization step 38 are performed in the same pond. In a yet third alternate embodiment, the evaporative step 34 and the cooling crystallization step 38 are performed in the same pond, but the pond is drained in the fall time period at step 36.

Figure 4:
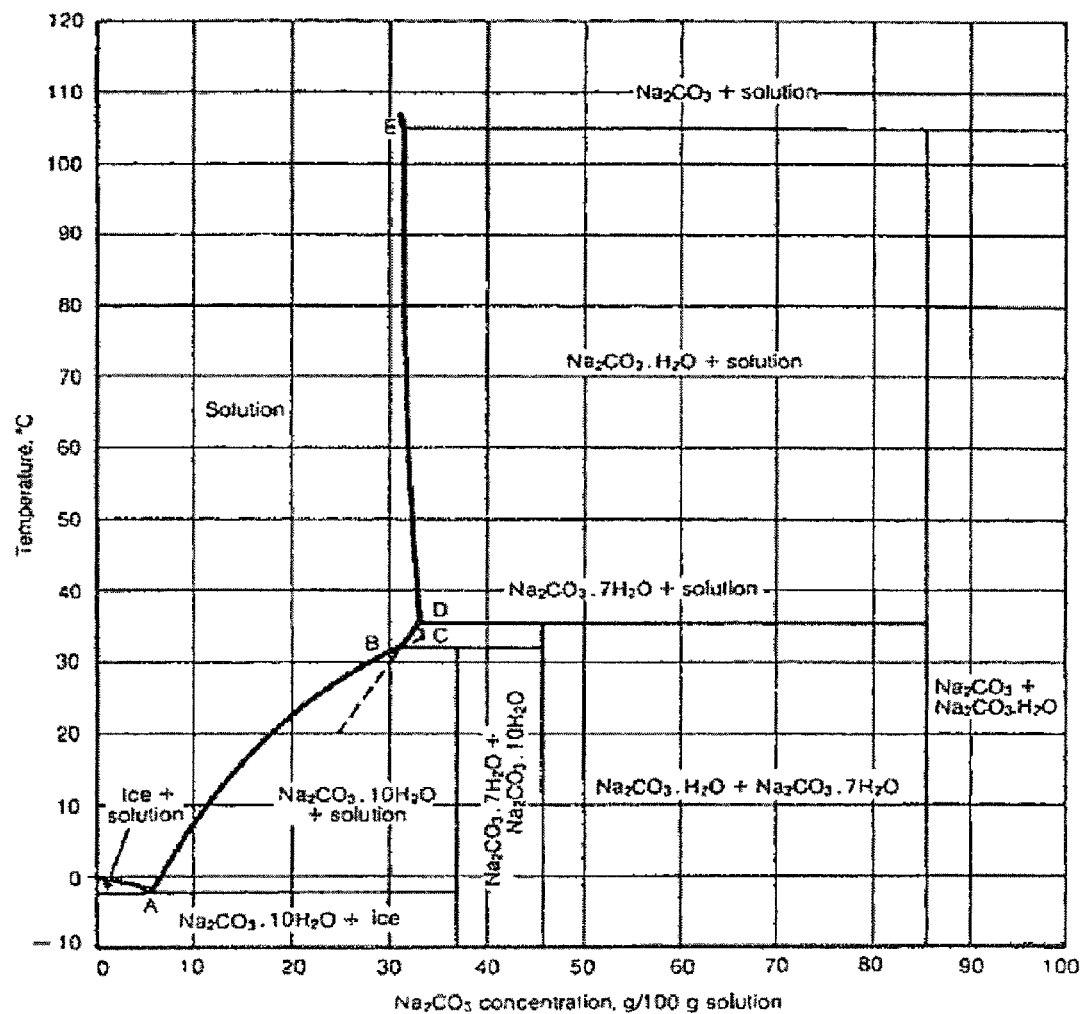
FIG. 4 is a phase diagram of the solubility of sodium carbonate in water.

FIG. 4 represents the phase diagram of the pure sodium carbonate-water system, which shows the various crystalline anhydrous and hydrated phases of sodium carbonate with respect to temperature and $Na_2CO_3$ concentration. Sodium carbonate decahydrate crystals ($Na_2CO_3 \cdot 10H_2O$) are formed when the solution $Na_2CO_3$ concentration and temperatures are within the decahydrate crystallization zone in the lower left corner of the phase diagram of solubility of the sodium carbonate-water system. As shown in FIG. 4 with the pure solution system, sodium decahydrate crystals are preferentially formed when the solution $Na_2CO_3$ concentration is about 37 wt. % or less. Sodium decahydrate crystals are also formed when the temperature is about 32° C. (90° F.) or less. However, at that temperature some evaporation crystallization also can occur. Therefore, it is preferable to operate under conditions promoting cooling crystallization rather than evaporative crystallization. Conditions comprising an ambient temperature of 50° F. or lower (10° C. or less) are suitable to obtain cooling crystallization with little or no evaporative crystallization. Preferred operating temperatures may also vary with the specific sodium carbonate solution concentrations, types of other salts and impurity concentrations, as well as the climate and elevation where the crystallization operations are taking place. In preferred embodiments, the conditions for promoting cooling crystallization conditions will include a pond solution temperature which is less than the crystallization temperature. Providing cooling crystallization promoting conditions may include exposing the pond solution to ambient temperature over a certain period of time (e.g., 7, 15 or 30 days) wherein the average ambient high temperature is below the crystallization temperature (Tcrystallization) of sodium carbonate decahydrate, the crystallization temperature being determined for the sodium carbonate content of the pond solution. For the pure sodium carbonate-water system, the crystallization temperature can be determined by the line A-B in the left bottom quadrant of FIG. 4. For example, for a pure sodium carbonate solution containing 20 wt % $Na_2CO_3$, the Tcrystallization would be about 23° C. or 73.4° F. The cooling crystallization promoting conditions preferably include an average ambient high temperature over a certain period of time (e.g., 7, 15 or 30 days) which is less than Tcrystallization, preferably which is equal to or less than Tcrystallization −5° C., or more preferably which is equal to or less than Tcrystallization −10° C. The cooling crystallization promoting conditions may include an average ambient high temperature over a certain period of time (e.g., 7, 15 or 30 days) which is equal to or less than Tcrystallization −15° C., or which is equal to or less than Tcrystallization −20° C.

Turning now to a further description of the first preferred embodiment of the present invention, a pond is filled starting in a spring time period wherein the average daily high temperature over a thirty-day period is greater than 35° F. (or greater than 1.7° C.), which in Green River, Wyo. is preferably in March (step 32). The filling of the pond continues (step 34) during the summer season. The summer season is minimally a period of time wherein the average daily high temperature over a thirty day period is greater than 50° F. (or greater than 10° C.). After the summer season and during a fall season, the flow of effluent to the pond is stopped (step 36). Step 36 may occur around September or October, depending on the ambient high temperature observed locally. The liquor from the pond is drained to a mother liquor pond area. Further effluent is introduced into a different pond area in step 38. As previously described, it is preferable that the crystallization pond area is a drained pond area before the effluent is introduced. The effluent is cooled in the crystallization pond area to precipitate sodium carbonate decahydrate during a winter season wherein the average daily high temperature over a thirty day period is less than 35° F. (or less than 1.7° C.). This is essentially the December to February period in Green River, Wyo. At the end of the winter period, and preferably before a spring period, the flow of the effluent to the crystallization pond area 20 is stopped (step 40). The flow of effluent may be continued to another, different pond (such as any of the ponds 22, 24, 26 from FIG. 1). The liquor is drained from the crystallization pond area 20 to the mother liquor pond area 30. The draining of the liquor from the pond area 20 to the mother liquor pond area 30 preferably occurs when the high ambient temperature is still cool enough so that the precipitated sodium carbonate decahydrate does not redissolve when the pond solution heats up in the spring period. The draining of the liquor from the pond area 20 to the mother liquor pond area 30 preferably occurs when the daily ambient high temperature is still less than the crystallization temperature (Tcrystallization) of sodium carbonate decahydrate for example higher than Tcrystallization −10° C. or higher than Tcrystallization −5° C., but may have increased over the course of a 30-day period. After the pond is drained, the sodium carbonate decahydrate is removed from the crystallization pond area 20.

In the second preferred embodiment, the evaporative process 34 and the cooling crystallization process 38 occur in the same pond area. The effluent is concentrated in step 34 by evaporation for at least a portion of a third period, such as a summer season, wherein the average daily high temperature over a thirty day period is greater than 50° F. (10° C.). The liquor is not drained from the pond area during step 36. Instead, further effluent is added to the existing concentrated pond solution during the winter months, and sodium carbonate decahydrate is precipitated by cooling crystallization. The pond is drained in the spring period in step 40.

In the third preferred embodiment, the process may be used to crystallize in both the summer and the winter. During step 32, the effluent is directed to a crystallization pond, where sodium carbonate decahydrate forms by evaporative crystallization. At the end of the summer in step 36, the flow of effluent to the pond is stopped. A hard sodium carbonate decahydrate layer is allowed to form, and the remaining liquor is drained to the mother liquor pond. The hard sodium carbonate decahydrate forms a base layer upon which further effluent is directed in the winter. In the step 38, another sodium carbonate decahydrate soft deposit is formed via cooling crystallization during winter months on top of the hard sodium carbonate decahydrate base layer. In step 40, such as at the onset of spring, the flow of effluent containing sodium carbonate to the crystallization area is stopped. The soft sodium carbonate decahydrate deposit may then be removed from the hard sodium carbonate decahydrate base layer disposed underneath, which is left at the bottom of the crystallization pond.

In a fourth preferred embodiment, a method of producing sodium carbonate decahydrate includes providing a first pond area, a second pond area, and a third pond area situated at a lower elevation then the first and second pond areas. Effluent including a sodium carbonate solution in water is introduced to the first pond area to provide a pond solution comprising less than 10% NaCl and less than 3% $Na_2SO_4$. The effluent introduced into the first pond area and/or the pond solution is cooled to form crystals of sodium carbonate decahydrate which deposit at the bottom first pond area under cooling precipitation conditions, for example during a first period, such as a winter season, wherein the average daily high temperature over a thirty day period is less than 50° F. (10° C.), or preferably less than 35° F. (1.7° C.). The flow of the effluent to the first pond area is stopped. The effluent is introduced to the second pond area. A liquor is drained from the first pond area to the third pond area. The sodium carbonate decahydrate deposit is removed from the first pond area by mechanical excavation. Effluent in the second pond area repeats the same cycle as described for the first pond area in alternating winter seasons or shorter time periods. For example, during a single winter season, the effluent may be diverted from the first pond area to the second pond area, while the first pond area is cooled and drained. Then the effluent is redirected back to the first pond area, while the second pond area is cooled and drained. This cycle may be repeated until the end of the winter season or until one of the pond areas is full, whichever is sooner. In this embodiment, successive thin layers of soft sodium carbonate decahydrate are formed in each pond during a single winter season. The first pond area and the second pond area are finally drained, and the sodium carbonate decahydrate deposit is recovered from both pond areas at the end of the winter season, or from the full pond area, in a manner as previously described.

The depth of the precipitated sodium carbonate decahydrate desposit in the previously described processes is generally 1 to 1.5 feet per crystallization cycle, wherein each crystallization cycle includes flooding the pond area with the effluent and then draining it. Multiple crystallization cycles may be performed to accumulate thicker deposits in the pond area.

In another preferred embodiment, an impermeable layer or substrate (such as plastic) may be placed on the ground before the effluent is introduced into the pond area. The pond area over which the impermeable layer is installed should be relatively flat and level. The impermeable layer may be sized as a square with sides about 100 feet long, but larger or smaller sizes or other shapes may be used as necessary. The effluent is discharged on top of the impermeable layer where it spreads out as a relatively thin sheet flow to allow the discharged effluent to cool quickly. Because of this cooling, crystalline sodium carbonate decahydrate forms in very thin layers ranging in thickness from a fraction of an inch up to 2 to 3 inches (e.g., up to about 7.6 cm). After the sodium carbonate decahydrate is built up a few inches in the first area, the flow of effluent may be diverted by the buildup to another area so that sodium carbonate decahydrate may be deposited in the second area. When that second area is also built up, the flow of effluent may be moved again to a third area. In this fashion, the effluent may be distributed about the entire surface of the pond area. The total thickness of the new sodium carbonate decahydrate layers may range from about 12 inches (30.5 cm)

or thicker nearest the discharge point to an inch or less (2.54 cm or less) at the farthest point from the effluent discharge. The sodium carbonate decahydrate layer deposited may be firm enough to support a motor grader to cut and windrow the sodium carbonate decahydrate layer, allowing an efficient recovery of the relatively thin deposit.

This "thin layer" approach has several advantages. It does not require large dikes or pond walls, because the pond solution does not accumulate to a great depth. By spreading the accumulated sodium carbonate decahydrate deposit out over a relatively large area, a significant amount of sodium carbonate decahydrate can be accumulated without the need for frequent switching of effluent flows into and out of smaller ponds or cells. The thin layers may be firm enough to support equipment to recover the crystalline sodium carbonate decahydrate deposit very efficiently.

The bulk density of the precipitated sodium carbonate decahydrate deposit formed by the previously described cooling crystallization processes is preferably less than about 80 lb/ft$^3$ (about 1,281 kg/m$^3$), more preferably less than about 65 lb/ft$^3$ (about 1,041 kg/m$^3$). In contrast, sodium carbonate decahydrate deposit formed by evaporative crystallization has a density of greater than about 90 lb/ft$^3$ (about 1,442 kg/m$^3$).

The ASTM D 1586 Standard Test Method for Penetration Test and Split-Barrel Sampling of Soils (also known as the Standard Penetration Test, SPT) may be used to characterize the hardness of the sodium carbonate decahydrate deposit. Under the ASTM D 1586 test, preferably less than 5 blows are required to penetrate 6 inches into the precipitated sodium carbonate decahydrate deposit formed by the previously described cooling crystallization process.

The removed (recovered) deposit may have a composition which preferably includes at least 30% sodium carbonate, less than 2% sodium bicarbonate and less than 1% sodium sulfate. The recovery of sodium carbonate from the effluent is preferably at least about 60%.

The removed sodium carbonate decahydrate deposit may be introduced to a soda ash production process without neutralizing the sodium bicarbonate present in the recovered sodium carbonate decahydrate deposit with NaOH or other basic solution. In embodiments where the effluent comprises or consists of an effluent from a soda ash production plant, the recovered sodium carbonate decahydrate deposit may be re-introduced to the soda ash production process without neutralizing the sodium bicarbonate present in the recovered deposit with NaOH or other basic compounds.

In other embodiments where the effluent comprises or consists of an effluent from a soda ash production plant, the recovered sodium carbonate decahydrate deposit may be re-introduced to the soda ash production process with neutralizing the sodium bicarbonate present in the recovered deposit with NaOH or other basic compounds, but the amount of NaOH or other basic compounds used in the neutralization is reduced compared to a process in which the re-introduced recovered sodium carbonate decahydrate deposit has been generated by evaporative crystallization or a combination of evaporative crystallization and cooling crystallization.

In another preferred embodiment, the process may be used to additionally recover sodium carbonate decahydrate from an existing pond containing an evaporative sodium carbonate decahydrate deposit. A channel may be formed in the sodium carbonate decahydrate deposit. The channel includes a first end and a second end. The effluent is introduced into the crystallization pond area adjacent the first end of the channel. The effluent dissolves a substantial portion of the evaporative sodium carbonate decahydrate deposit to form a pond solution at the second end of the channel. The temperature of the effluent at the first end of the channel is at least 90° F. (32.2° C.), and the temperature of the enriched solution at the second end of the channel is less than 60° F. (15.6° C.). This additional dissolution and recovery step may be used with any of the previously mentioned processes.

In addition, the invention may have broader applicability when considering the underlying inventive concepts. (1) the managing of the flow of the effluent in order to separate the decahydrate deposit produced by cooling from the decahydrate deposit produced by evaporation. In this concept, the elevation of the mother liquor pond is not essential. But advantages are obtained when the flow is stopped into the crystallization pond when the average daily temperature is above the crystallization temperature. (2) the use of ponds at different elevations to drain in a cost effective way the mother liquor from the crystallization pond to the lower pond which may act additionally as an evaporative pond. Such a two-pond system, the second one acting not only to drain but also to evaporate provides additional advantages over previous use of ponds.

This invention may be applicable to salts other than sodium carbonate decahydrate, such as other alkali products or a crystallizable mineral salt. Particularly, applications of the present invention may comprise the valorization of a waste stream by recovery of a desired crystalline alkali product or mineral salt, in instances where the alkali product or mineral salt is able to generate different crystalline deposits under cooling and evaporative crystallization conditions, wherein the different crystalline deposits may differ in a property such as purity of the desired alkali product or mineral salt, bulk density, hardness, or any combinations thereof.

The present invention having been generally described, the following Examples are given as particular embodiments of the invention and to demonstrate the practice and advantages thereof. It is understood that the examples are given by way of illustration and are not intended to limit the specification or the claims to follow in any manner.

EXAMPLES

Example 1

Figure 3:
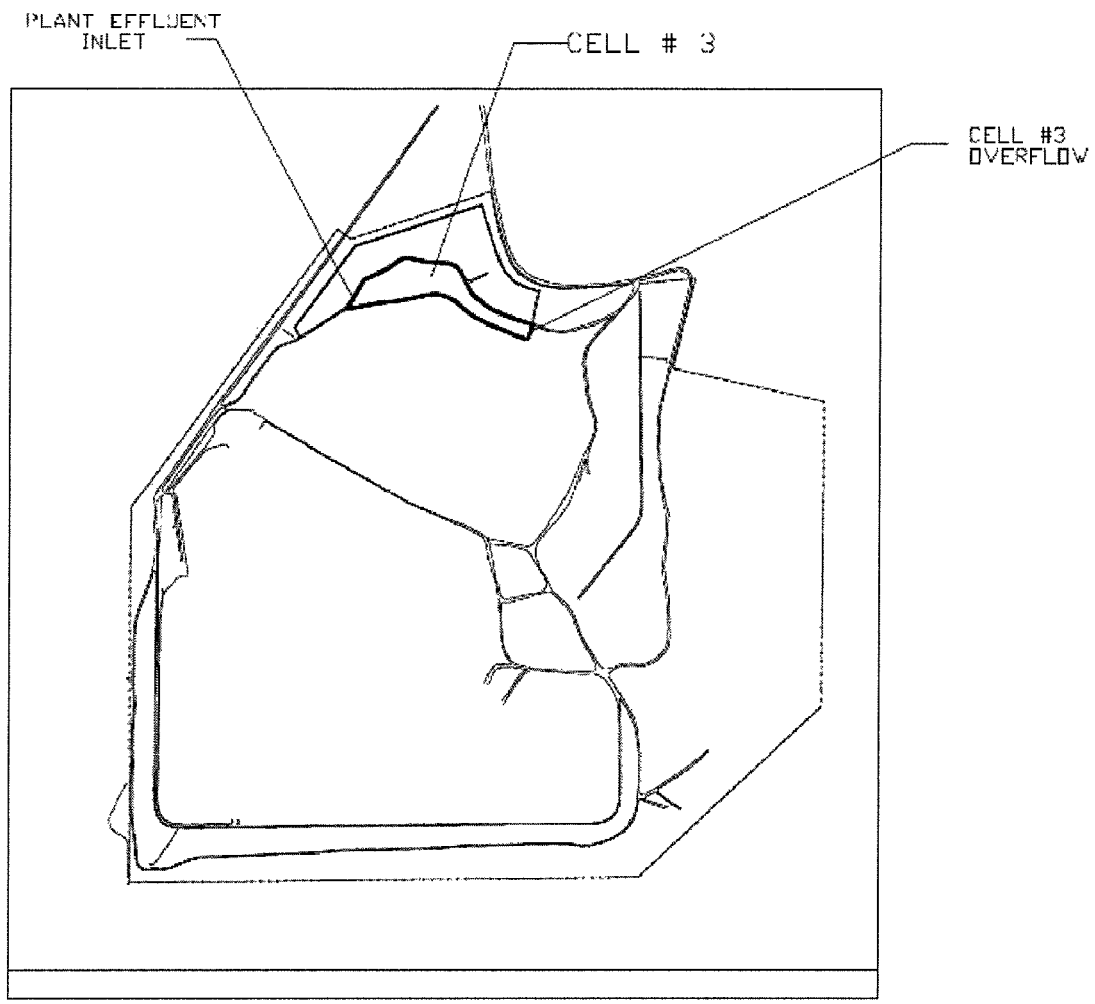
FIG. 3 is a map showing the pond layout for an embodiment of a method of producing sodium carbonate decahydrate.

A crystallization process for the recovery of sodium carbonate decahydrate was instituted at a soda ash plant in Green River, Wyo. A crystallization pond area ("Cell #3") was prepared as shown in FIG. 3. The overflow from Cell #3 was directed to a trench to a second pond. Existing evaporative sodium carbonate decahydrate in Cell #3 was removed down to a hard pink layer which formed a solid base for equipment to operate on. The resulting basin provided the crystallization pond which was 4 feet deep (122 centimeters) and covered about 4.7 acres (about 19,000 m$^2$). Effluent from a soda ash plant was pumped through a 6-inch (15.24 cm) diameter HDPE line which was 600 feet long (183 m) to a first end of Cell #3, at a rate of from 450 to 600 gal/min (about 1,700-2,270 L/min).

In a first phase of operation, an effluent from the soda ash plant was provided to the crystallization pond area over a period of 12 days in the month of December. In a second phase of operation, the effluent was provided to the crystallization pond area over a period of 4 days in the months of January to February. In each phase, crystalline sodium carbonate decahydrate precipitated by cooling crystallization to form a deposit, the remaining liquor from the pond was drained, and the sodium carbonate decahydrate deposit was recovered. During the first phase of operation, 4,986 tons of Na$_2$CO$_3$ were introduced into the crystallization pond area from the plant effluent, and an estimated 3,288 tons of soda ash were deposited in the crystallization pond area (cell #3), for a recovery of 66%. During the second phase of the test, 1,855 tons of sodium carbonate were introduced into the crystallization pond from the plant effluent, and an estimated 1,217 tons were deposited, for a recovery of 66%.

The sodium carbonate decahydrate deposit formed by cooling crystallization was a white, easily broken up mass. It was very soft and easy to dig up with a front end loader. The average bulk density was 58 lbs/ft$^3$ (929 kg/m$^3$). It was easier to handle than the sodium carbonate decahydrate deposit formed by evaporation, which had a dirt gray color and formed a hard crystal mass with a bulk density of 93 lbs/ft$^3$ (1,490 kg/m$^3$). It was not possible to remove the evaporative sodium carbonate decahydrate deposit with a front end loader. To remove, the evaporative sodium carbonate decahydrate deposit had to be either broken up into smaller pieces with a pavement reclaimer machine, or smashed with a track hoe bucket.

Table 2 below shows the composition of sodium carbonate decahydrate formed by cooling crystallization in Example 1 compared to sodium carbonate decahydrate formed by evaporative crystallization from previous processes. It can be seen that the sodium carbonate decahydrate formed by cooling crystallization included much less sodium bicarbonate and sodium sulfate than sodium carbonate decahydrate formed by evaporative crystallization. The reduction in sodium bicarbonate allows the sodium carbonate decahydrate to be used directly in a soda ash plant without the need to neutralize with a base such as NaOH.

TABLE 2

|  | Cooling Crystallization | Evaporative Crystallization |
| --- | --- | --- |
| Na$_2$CO$_3$, wt % | 33.7 | 34.9 |
| NaHCO$_3$, wt % | 0.32 | 2.7 |
| NaCl, wt % | 0.42 | 0.37 |
| Na$_2$SO$_4$, wt % | 0.40 | 1.15 |

The ASTM D 1586 Standard Test Method for Penetration Test and Split-Barrel Sampling of Soils (also known as the Standard Penetration Test or SPT) was used to characterize the sodium carbonate decahydrate deposit formed by evaporative crystallization and cooling crystallization. The test was performed on several samples of in-situ sodium carbonate decahydrate deposit at the pond. The evaporative sodium carbonate decahydrate required 10 to 50 blows to penetrate 6 inches (15.24 cm). The cooling crystallization sodium carbonate decahydrate required 2 to 5 blows to penetrate 6 inches.

Thus, it can be seen that the method of processing the effluent allowed recovery of a sodium carbonate decahydrate product of improved purity. Additionally, it provided sodium carbonate decahydrate that was less dense and softer, so that it could be more easily removed from the crystallization pond to recover the valuable soda ash.

Example 2

An attempt was made to use the process to recover sodium carbonate decahydrate that had previously been deposited by evaporative crystallization. A 160 foot long channel was cut through a deposit of evaporative sodium carbonate decahydrate. Plant effluent at a temperature of from 97° F. to 131° F. (36-55° C.) was distributed to a first end of the channel. The effluent stream dissolved the evaporative sodium carbonate decahydrate around the channel, widening it as the trial proceeded. An attempt to enhance this effect proceeded by using a front-end loader to transport material from the evaporative sodium carbonate decahydrate pile into the channel. The temperature of the plant effluent entering the channel was 92° F. (33.3° C.), while the temperature of the solution exiting the channel was 51° F. (10.6° C.). This decrease in temperature was caused by the endothermic reaction of the dissolution of the sodium carbonate decahydrate. The resulting solution was allowed to recrystallize, and the sodium carbonate decahydrate was recovered.

Example 3

Sheets of plastic film were positioned over a section of a relatively flat and level pond area covering approximately 40 acres (about 162, 000 m$^2$) to form a liquid-impermeable substrate. The area covered by the plastic sheets was a square approximately 100 feet (30.5 m) on each side. During a winter period, a soda ash plant effluent was discharged onto the plastic film. The effluent discharge point was located over the plastic film, which forced the effluent to spread out into a relatively thin layer as it flowed away from the discharge point. Without the plastic film, the hot effluent tended to dissolve any underlying sodium carbonate decahydrate deposits to form a pit; the liquid would then flow from that pit in a narrow, deep channel so that there was little cooling of the effluent. In contrast, the liquid layer deposited on the plastic sheet cooled relatively quickly, and crystalline sodium carbonate decahydrate started to form in relatively thin layers ranging in thickness from a fraction of an inch up to 2 to 3 inches in thickness. After the sodium carbonate decahydrate had built up a few inches in one area, the flow of effluent was diverted to another area and deposited sodium carbonate decahydrate there. When that area also built up, the flow moved again to a third area. In this fashion, the flow moved itself about the surface of the discharge area, depositing sodium carbonate decahydrate in a period of a month and one half over almost all of the 40-acre area. The total thickness of these sodium carbonate decahydrate layers ranged from 12 to 14 inches (30.5-35.6 cm) nearest the discharge point, to about an inch at the farthest point from the discharge. The sodium carbonate decahydrate formed by the process of Example 3 was similar to that formed in the previous Examples. Besides being very pure, it was found that the sodium carbonate decahydrate resulting from the process of Example 3 was also firm enough to support a motor grader that could easily cut and withdraw the sodium carbonate decahydrate, allowing an efficient recovery of the relatively thin deposits.

It should be appreciated that the methods and compositions of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

The invention claimed is:

1. A method of producing sodium carbonate decahydrate, comprising:
   providing a crystallization pond area;
   providing a liquor pond area situated in proximity to the crystallization pond area;
   providing an effluent comprising a sodium carbonate solution in water;
   introducing said effluent to the crystallization pond area to provide a pond solution comprising sodium carbonate;
   cooling the pond solution in the crystallization pond area by exposure to ambient temperature to provide cooling crystallization promoting conditions effective in forming crystals of sodium carbonate decahydrate and to form a crystalline sodium carbonate decahydrate deposit;
   stopping the flow of the effluent to the crystallization pond area during at least a portion of a time period wherein exposure of the pond liquor to ambient temperature no longer supports cooling crystallisation promoting conditions of sodium carbonate decahydrate;
   draining liquor from the crystallization pond area to the liquor pond area; and
   removing the crystalline sodium carbonate decahydrate deposit from the crystallization pond area.

2. A method of producing crystals of a crystallizable mineral salt, comprising:
   providing a crystallization pond area;
   providing a mother liquor pond area situated in proximity to the crystallization pond area;
   providing an effluent comprising a mineral salt solution in water;
   introducing the effluent to the crystallization pond area to provide a pond solution comprising the mineral salt;
   cooling the pond solution in the crystallization pond area solution by exposure to ambient temperature to provide cooling crystallization promoting conditions effective in forming mineral salt crystals and to form a crystalline deposit during at least a portion of a first time period in which the average daily high ambient temperature is less than $T_{crystallization}$-5° C.;
   stopping the flow of the effluent to the crystallization pond area during at least a portion of a second time period in which the average daily high ambient temperature is greater than $T_{crystallization}$-5° C.;
   draining liquor from the crystallization pond area to the mother liquor pond area; and
   removing the deposit comprising said mineral salt crystals from the crystallization pond area.

3. The method of claim 1 wherein the pond solution comprises less than 10% NaCl and less than 3% $Na_2SO_4$.

4. The method of claim 1 wherein the crystallization pond area comprises a drained pond area before the effluent is introduced.

5. The method of claim 4 further comprising placing an impermeable substrate on the drained crystallization pond area before introducing the effluent to the drained crystallization pond area.

6. The method of claim 1 where the liquor is drained from the crystallization pond area to the liquor pond area by gravity.

7. The method of claim 1 where the effluent comprises at least a portion of a stream exiting a soda ash production plant.

8. The method of claim 1 further comprising concentrating the effluent by evaporation before introducing the effluent to the crystallization pond area.

9. The method of claim 1 wherein the step of cooling the pond solution to provide cooling crystallization promoting conditions comprises exposing the pond solution to ambient temperature during at least a portion of a 30-day time period in which the average daily high ambient temperature is equal to or less than $T_{crystallization}$-5° C.

10. The method of claim 1 wherein the step of cooling the pond solution to provide cooling crystallization promoting conditions comprises exposing the pond solution to ambient temperature during at least a portion of a 30-day time period in which the average daily high ambient temperature is less than 10° C.

11. The method of claim 1 wherein the step of cooling the pond solution to provide cooling crystallization promoting conditions comprises exposing the pond solution to ambient temperature during at least a portion of a 30-day time period in which the average daily high ambient temperature is less than 1.7° C.

12. The method of claim 1 where the step of stopping the effluent flow is carried out during at least a portion of a 30-day time period in which the average daily high ambient temperature is greater than 1.7° C. or than $T_{crystallization}$-5° C.

13. The method of claim 1 where the step of stopping the effluent flow is carried out during at least a portion of a 30-day time period in which the average daily high ambient temperature is greater than 1.7° C. but does not exceed the crystallization temperature of sodium carbonate decahydrate.

14. The method of claim 1 further comprising introducing the effluent to a second crystallization pond area which is operated under evaporative crystallization promoting conditions effective in crystallizing sodium carbonate decahydrate to form a second deposit during at least a portion of a 30-day time period in which the average daily high ambient temperature is greater than 1.7° C. or than $T_{crystallization}$-5° C.,
   wherein the sodium carbonate decahydrate deposit generated under cooling crystallization promoting conditions comprises a lower hardness than the second deposit generated under evaporative crystallization promoting conditions.

15. The method of claim 1 wherein the deposit generated in the crystallization pond area under cooling crystallization promoting conditions comprises a lower hardness compared to an evaporative deposit that would be generated from the effluent under evaporative crystallization promoting conditions said evaporative deposit having a hardness of at least 10 blows to penetrate 6 inches as measured under an ASTM D 1586 Standard Penetration Test.

16. The method of claim 14 wherein the deposit generated in the crystallization pond area under cooling crystallization promoting conditions further comprises a higher sodium carbonate purity than an evaporative deposit that would be generated from the effluent under evaporative crystallization promoting conditions.

17. The method of claim 1 wherein the sodium carbonate decahydrate deposit generated in the crystallization pond area under said cooling crystallization promoting conditions has a bulk density less than about 80 lb/ft$^3$.

18. The method of claim 1 wherein the sodium carbonate decahydrate deposit generated in the crystallization pond area under said cooling crystallization promoting conditions has a bulk density of less than about 65 lb/ft$^3$.

19. The method of claim 1 wherein the removed sodium carbonate decahydrate deposit comprises at least 30% sodium carbonate.

20. The method of claim 1 wherein the removed sodium carbonate decahydrate deposit comprises less than 2% sodium bicarbonate.

21. The method of claim 1 wherein the removed sodium carbonate decahydrate deposit comprises less than 1% sodium sulfate.

22. The method of claim 1 wherein the recovery of sodium carbonate from the effluent is at least about 60%.

23. The method of claim 1 wherein the effluent is at a temperature of between 32.2° C. and 60° C. when it is introduced into the crystallization pond area.

24. The method of claim 1 further comprising introducing the removed sodium carbonate decahydrate deposit to a soda ash production process.

25. The method of claim 1 wherein the crystallization pond area comprises a plurality of cooling crystallization pond areas;
wherein the liquor pond area is configured to receive liquor from said plurality of cooling crystallization pond areas;
wherein the method comprises carrying out, for each of the crystallization pond areas, a cycle of steps comprising introducing an effluent, cooling the effluent to form a crystalline sodium carbonate decahydrate deposit, draining remaining liquor into the liquor pond area and removing the deposit, wherein some of the cycles are carried out sequentially or concurrently.

26. The method of claim 25 wherein the step of cooling the pond solution to provide cooling crystallization promoting conditions in each cycle comprises exposing the pond solution to ambient temperature during at least a portion of a first time period in which the average daily high ambient temperature is less than 1.7° C., and wherein the step of stopping the effluent flow in each cycle is carried out after a second time period in which the average daily high ambient temperature is greater than 1.7° C.

27. The method of claim 25 wherein the step of cooling the pond solution to provide cooling crystallization promoting conditions in each cycle comprises exposing the pond solution to ambient temperature during at least a portion of a first time period in which the average daily high ambient temperature is less than $T_{crystallization}$-5° C., and wherein the step of stopping the effluent flow in each cycle is carried out after a second time period in which the average daily high ambient temperature is greater than $T_{crystallization}$-5° C.

28. A method of producing crystals of a crystallizable mineral salt, comprising:
providing a first crystallization pond area and a second crystallization pond area;
providing a mother liquor pond area situated in proximity to the crystallization pond areas;
providing an effluent comprising a mineral salt solution;
introducing the effluent to the first crystallization pond area to provide a first pond solution comprising the mineral salt;
cooling the pond solution in the first crystallization pond area solution by exposure to ambient temperature to provide cooling crystallization promoting conditions effective in forming mineral salt crystals and to form a first crystalline mineral salt deposit during at least a portion of a first time period in which the average daily high ambient temperature is less than Tcrystallization;
stopping the flow of the effluent to the first crystallization pond area during at least a portion of a second time period in which cooling crystallization promoting conditions during at least a portion of a second time period wherein exposure of the pond liquor to ambient temperature no longer supports cooling crystallization promoting conditions of the mineral salt; and
introducing the effluent to a second crystallization pond area by exposure to ambient temperature to provide evaporative crystallization promoting conditions effective in crystallizing sodium carbonate decahydrate to form a second deposit during at least a portion of a third time period in which the average daily high ambient temperature is greater than Tcrystallization;
wherein the first mineral salt deposit generated under cooling crystallization promoting conditions differs from the second mineral salt deposit generated under evaporative crystallization promoting conditions in a property selected from the group consisting of purity in mineral salt; hardness, density, and combinations of two or more thereof.

* * * * *